United States Patent Office 3,487,717
Patented Jan. 6, 1970

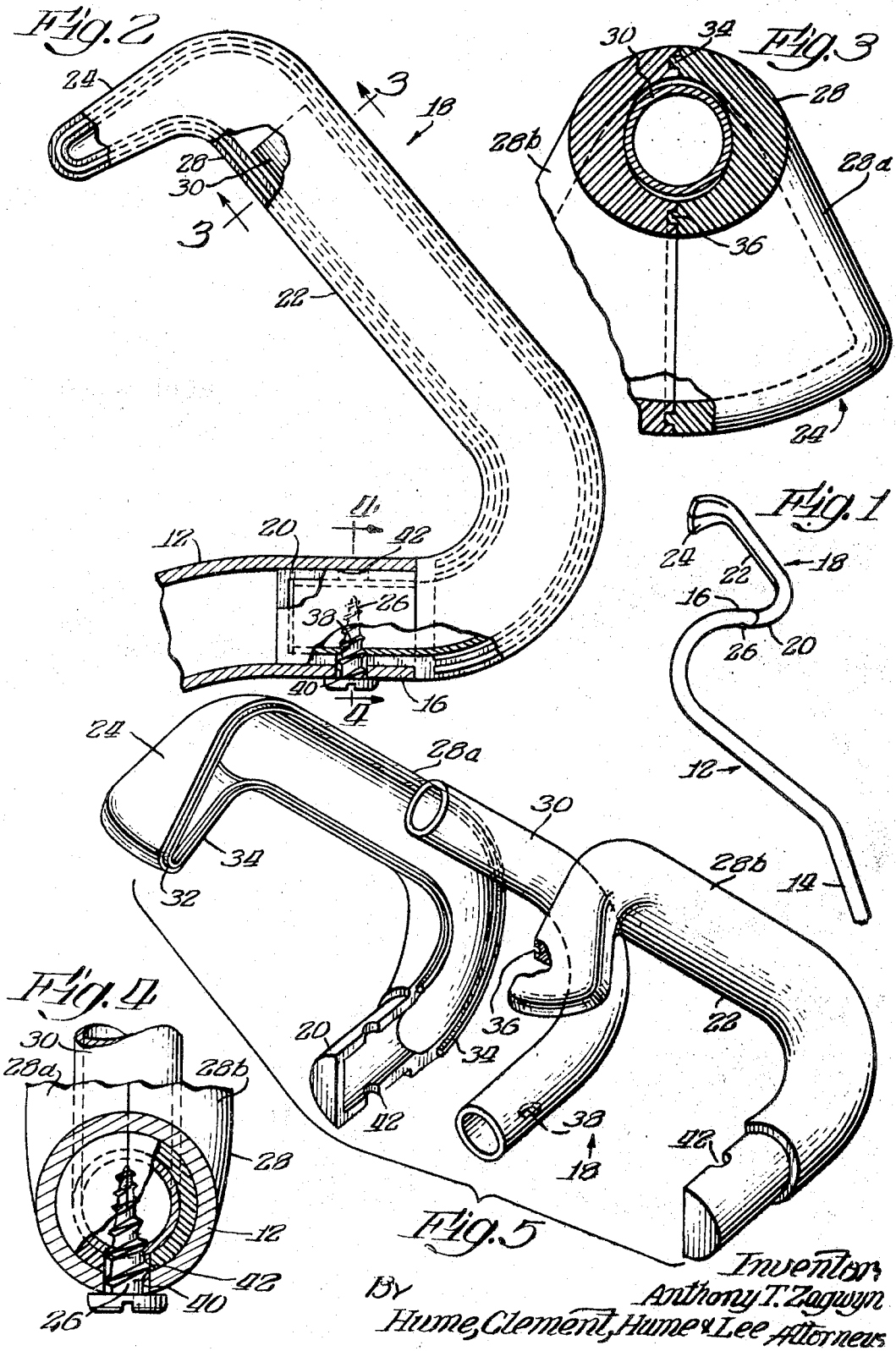

3,487,717
VEHICLE HANDLE CONSTRUCTION
Anthony T. Zagwyn, Delavan, Wis., assignor to AJ Industries Corporation, Delavan, Wis., a corporation of Wisconsin
Filed Aug. 8, 1968, Ser. No. 751,109
Int. Cl. B62k 21/12
U.S. Cl. 74—551.1    11 Claims

ABSTRACT OF THE DISCLOSURE

A steering or propelling handle for a vehicle, such as a golf cart. A tubular handlebar is adapted for attachment at one end to the vehicle, and at the other end to a handle grip structure. The handle grip includes an outer plastic shell and an inner tubular reinforcing insert. The shell is molded in two mating halves which are heat sealed or cemented after placement of the insert. The mating edges of the shell halves are provided with a congruent bead-and-groove system to assist in assembly of the shell. The shell includes a toe portion which is adapted for insertion into the end of the handlebar. The insert, the toe portion of the shell, and the end of the handlebar are provided with apertures which, when in registry, accommodate a fastening device, such as a self-threading screw. The shell includes, in addition to the toe portion, a central body portion disposed at an angle of 30 to 60 degrees with the toe portion, and a heel portion adapted to retard axial removal of the hand from the body portion.

BACKGROUND—SUMMARY—DRAWINGS

This invention relates to handles for vehicles and, in particular, to a novel handle structure for propelling or steering a relatively small wheeled vehicle, such as a golf cart. Although the invention will be described in the context of a handle for a golf cart, it should be understood that the novel handle construction is equally suitable for use in connection with any vehicle which is manually propelled or steered.

In the design of handles for golf carts and other vehicles, certain factors are of primary importance. These include ease of manufacture and assembly, low cost, strength, comfort, and appearance. Such handles as are currently available have failed to achieve all of these goals and still perform satisfactorily their intended function, i.e., a means for steering and/or propelling a cart. The present invention, however, achieves these goals with a high degree of satisfaction, being relatively simple and inexpensive to manufacture, readily assembled with but a single fastening device, extremely comfortable for the user, and highly functional yet pleasing in appearance.

In order to achieve these goals, the present invention contemplates a handle construction comprising a tubular handlebar and a handle grip consisting essentially of an outer plastic shell with a tubular reinforcing insert therein. The handlebar is adapted for attachment at one end to the vehicle and at the other end to the handle grip structure. The outer shell includes a toe portion which is adapted for insertion into the end of the handlebar. The shell also has a main body portion which is preferably angled at about 30 to 60 degrees to the axis of the toe portion, and may further include a heel portion adapted to resist axial removal of the user's hand from the body portion. The toe portion of the shell, the insert, and the end of the bar are all provided with apertures which, when in registry, permit the use of a single fastening means for assembling the structure. The shell may be molded in two substantially identical mating halves which are joined by heat sealing or cementing after placement of the tubular insert. The mating edges of the halves may include congruent perimetric beads and grooves to assist in assembly and heat sealing, and to give the shell additional strength.

The foregoing and additional structural features and advantages of the present invention will be more fully understood by considering the remainder of the specification and the claims, with illustrative reference to the drawing, in which:

FIGURE 1 is a perspective view of an assembled golf cart handle constructed in accordance with the present invention;

FIGURE 2 is a partially sectional elevation of a portion of the handle of FIGURE 1, partly broken away;

FIGURE 3 is a fragmentary sectional view taken on the line 3—3 of FIGURE 2;

FIGURE 4 is a sectional view taken on the line 4—4 of FIGURE 2; and

FIGURE 5 is an exploded perspective view of the grip portion of the handle of FIGURE 1.

DETAILED DESCRIPTION OF EXEMPLARY EMBODIMENT

With reference to the drawing, FIGURE 1 illustrates a vehicle handle constructed in accordance with the invention. The handle comprises a tubular handlebar 12 which is adapted for attachment near one end 14 to a golf cart or other vehicle (not shown). At its other end 16, the handlebar 12 is attached to a handle grip 18, which includes a toe portion 20, a main body portion 22, and a heel portion 24. The handle grip 18 is attached to the bar 12 by means of a fastening member 26.

As best seen in FIGURE 2, the handlebar 12 is of tubular construction, preferably of steel or aluminum. The toe portion 20 of the grip 18 is of somewhat smaller diameter than the remainder of the grip, so that it may be inserted into the end 16 of the bar 12. The grip 18 includes an outer plastic shell 28 and an inner tubular reinforcing insert 30. The insert 30, like the handlebar 12, is preferably formed of tubular steel or aluminum.

As shown in FIGURE 5, the shell 28 consists of two substantially identical mating halves 28a and 28b, preferably formed by injection molding or other suitable methods. The mating edge 32 of the shell half 28a includes a perimetric bead 34 which is essentially congruent with and adapted for insertion in a corresponding perimetric groove 36 on the mating edge of the shell half 28b. With this construction, the shell halves 28a and 28b can be easily assembled about the insert 30 and heat sealed or cemented along their mating edge to form a strong, unitary structure.

As best shown in FIGURES 2, 4, and 5, the insert 30 includes an aperture 38. Similarly, the end 16 of the bar 12 includes an aperture 40. Finally, the shell 28 is formed with an aperture 42 passing entirely through the toe portion 20. As shown in FIGURES 2 and 4, when the toe portino 20 of the grip 18 is inserted into the end of the bar 12, the apertures 38, 40, and 42 are in registry, thus permitting the insertion of a fastening device, such as the self-threading screw 26, therethrough. It will be noted that, because the aperture 42 passes entirely through the toe portion 20, the grip 18 may be disposed with respect to the bar 12 at an attitude essentially 180 degrees to that shown in the drawing.

As can be seen from FIGURE 2, the body portion 22 of the grip 18 is disposed with its axis at an angle of about 40 degrees to that of the toe portion 20. It has been found that the best results in terms both of function and comfort are achieved by maintaining this angular disposition within the range of from about 30 degrees to about 60 degrees. It will also be noted that the heel portion 24 of the grip 18 is disposed essentially normal to body portion 22. This disposition may be varied over wide limits without impairing the ability of the heel portion to retard or resist axial removal of the user's hand from the body portion 22. FIGURE 3 illustrates a terminal widening of the heel portion 24 which is further designed to provide comfort for the user.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

I claim:
1. A steering or propelling handle for a vehicle, comprising: a tubular handlebar adapted for attachment at one end to said vehicle; a hollow plastic handle grip shell having one end adapted for insertion into the unattached end of said bar; and a tubular reinforcing insert positioned within said shell.

2. A handle in accordance with claim 1, wherein said insert, said shell and said bar have apertures adapted, when in registry, to permit the insertion of a fastening means therethrough.

3. A handle in accordance with claim 2, including a self-tapping screw for insertion in said apertures.

4. A handle grip for attachment to a tubular handlebar, comprising: an outer plastic shell having a toe portion and a main body portion, said toe portion being adapted for insertion into an end of said bar; and an inner tubular insert.

5. A grip in accordance with claim 4, wherein said toe portion and said insert have apertures for registry with a similar aperture in said bar, so as to permit insertion of a fastening means therethrough.

6. A grip in accordance with claim 4, wherein said shell is molded in two mating halves adapted to be joined along their mating edges after placement of said insert.

7. A grip in accordance with claim 6, wherein the mating edge of one of said halves includes a perimetric groove, and the mating edge of the other half includes a congruent perimetric bead.

8. A grip in accordance with claim 4, wherein said body portion of said shell includes a terminal heel portion adapted to retard axial removal of a hand from said body portion.

9. A grip in accordance with claim 4, wherein the axis of said body portion forms an angle of from about 30 degrees to about 60 degrees with the axis of said toe portion.

10. A grip in accordance with claim 8, wherein the axis of said body portion forms an angle of from about 30 degrees to about 60 degrees with the axis of said toe portion.

11. A grip in accordance with claim 10, wherein said insert is substantially axially coextensive with said toe and body portions.

References Cited
UNITED STATES PATENTS

| 734,742 | 7/1903 | Patrick | 74—551.8 |
| 3,401,951 | 9/1968 | Bloom | 280—47.17 |

FRED C. MATTERN, JR., Primary Examiner

F. D. SHOEMAKER, Assistant Examiner

U.S. Cl. X.R.

280—47.17